UNITED STATES PATENT OFFICE.

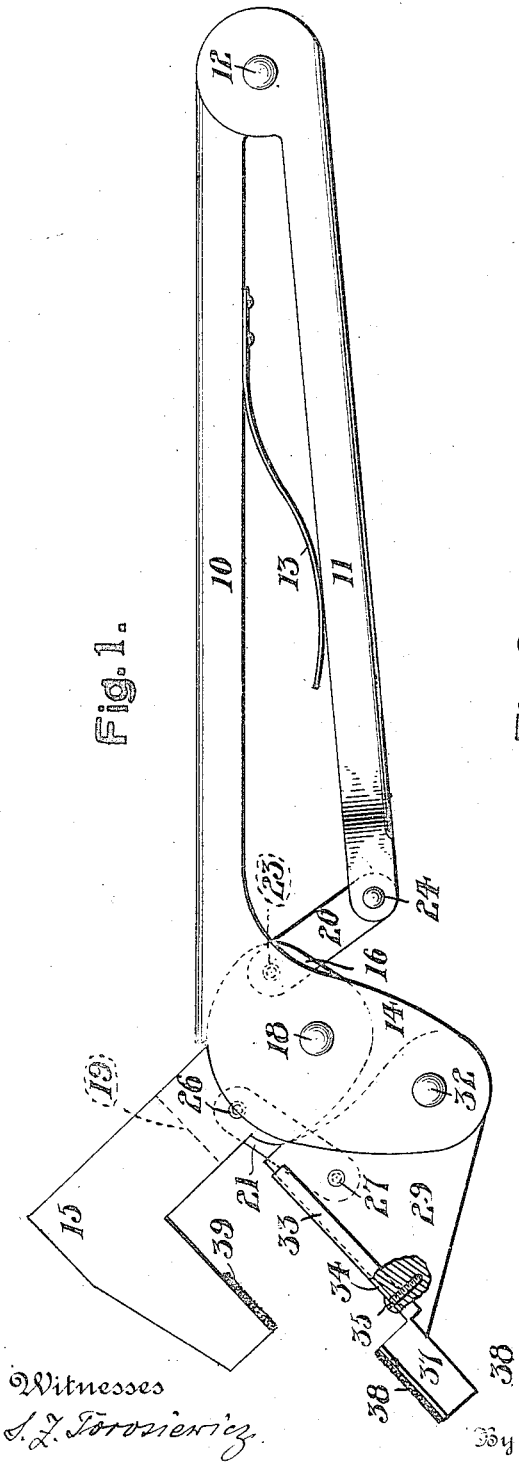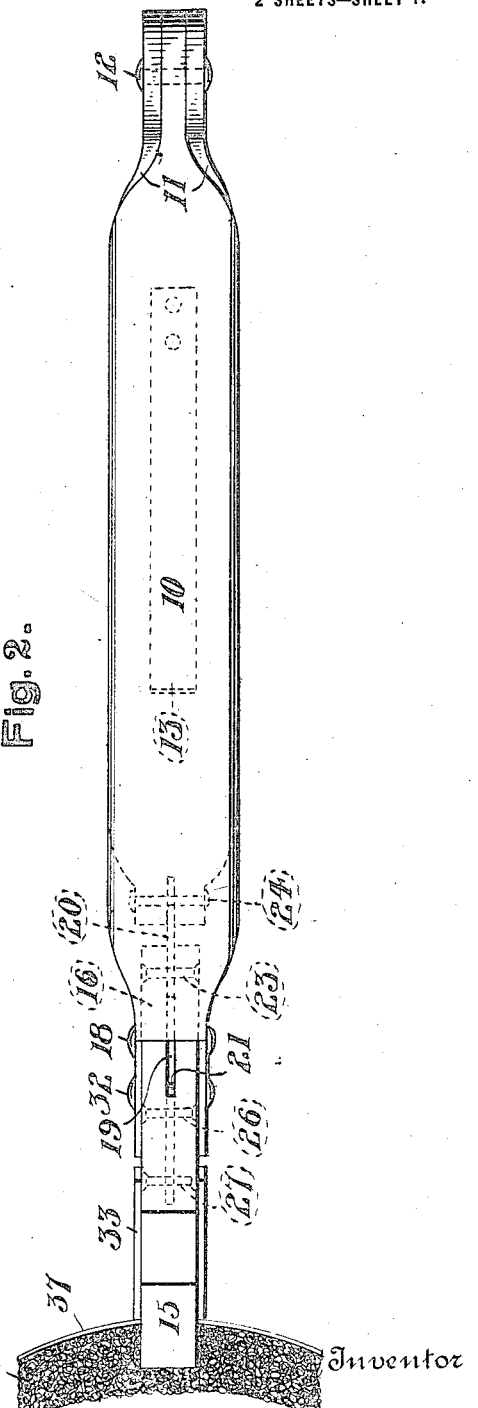

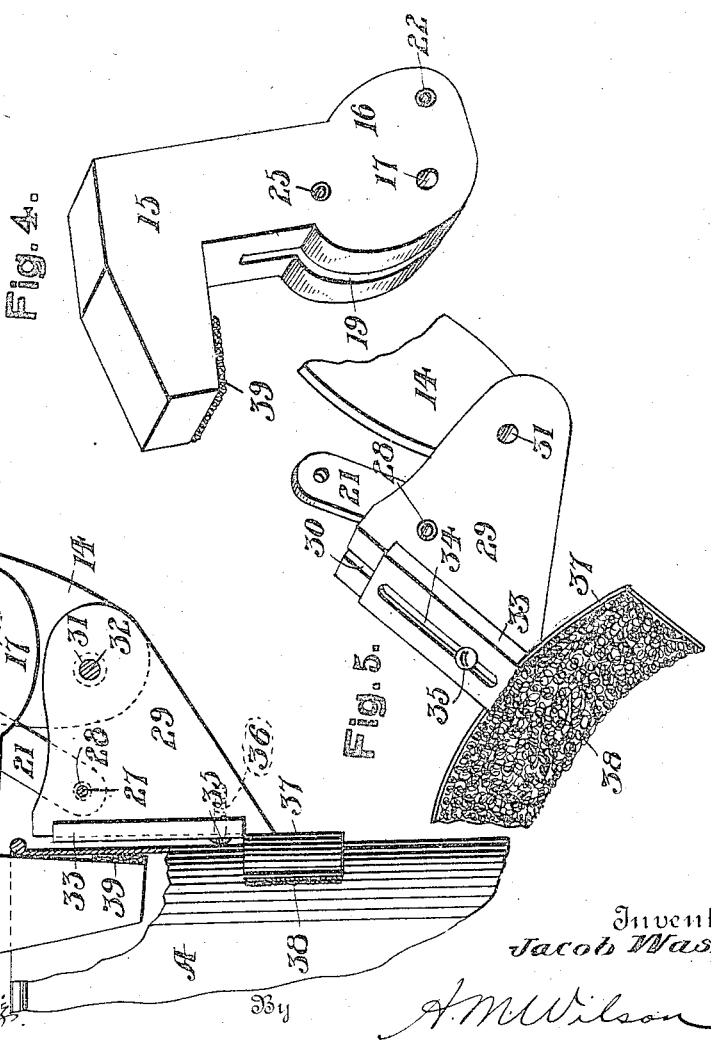

JACOB WASIK, OF WEST HAMMOND, ILLINOIS.

PAN-LIFTER.

1,140,781. Specification of Letters Patent. Patented May 25, 1915.

Application filed July 27, 1914. Serial No. 853,516.

*To all whom it may concern:*

Be it known that I, JACOB WASIK, a citizen of the United States of America, residing at West Hammond, in the county of Cook and State of Illinois, have invented certain new and useful Improvements in Pan-Lifters, of which the following is a specification.

This invention relates to certain new and useful improvements in pan lifters.

An object of the invention is to provide a pan lifter in the form of a pair of pliers that is adapted to grip the upper edge of a pan and constitute a handle by which the same may be lifted.

A further object of the invention is to provide a pan lifter of the plier type with pan engaging jaws, one of said jaws being adjustable relative to its support and the other of said jaws so as to provide a greater leverage in clamping the same on a pan.

A still further object of the present invention is to provide a pan lifter of the plier type, in which the jaws for gripping the pan are adapted in their closing movement to travel in the same general direction with one of the jaws moving faster than the other to provide for the closing of the same.

With the above general objects in view and others that will appear as the nature of the invention is better understood, the same consists in the novel construction, combination and arrangement of parts to be hereinafter more fully described and then claimed.

In the accompanying drawings which show the preferred embodiment of the present invention and to which reference is had herein by like characters designating corresponding parts throughout the several views:—Figure 1 is a side elevational view of the lifter. Fig. 2 is a top plan view of the same. Fig. 3 is a side elevational view, partly in section illustrating the same as applied to a pan. Fig. 4 is a perspective view of the upper jaw removed from the handle. Fig. 5 is a perspective view of the lower jaw with the pan gripping arm removed, and Fig. 6 is a perspective view of the pan gripping arm.

Briefly described, the invention comprises a pan lifter of the plier type with a pair of pan gripping jaws, the faces of which are preferably provided with asbestos or other non-heat conducting material, or an abrasive face. The jaws are pivoted in the same member and connected by a link, being so positioned and pivoted that movement of one of the handle members connected to one of said jaws by a link will cause the said jaws to move in the same general direction at different speeds to bring the jaws to closed position. The device is constructed of few parts that are extremely simple in construction and inexpensive to manufacture, with the result that there is provided a pan lifter that may be marketed at an extremely low cost and perform in an efficient manner the objects claimed for the same.

Referring more in detail to the accompanying drawings, the reference numerals 10 and 11 designate a pair of handle members pivoted at their rear ends as at 12 and normally held separated by the leaf spring 13 secured at one end to the handle member 10 and freely engaging at its other end the member 11. The outer end or head of the handle 10 is bifurcated to provide a pair of supporting members 14, as clearly shown in Fig. 3.

The pan gripping jaws are pivoted in the head 14, the upper of said jaws being designated 15 having the enlarged inner end 16 with a transverse opening 17 for the pin 18 extending transversely of the head 14 and on which the said jaw member 15 is pivoted. The inner end 16 of the jaw 15 is slotted as at 19 to provide a clearance for the links 20 and 21. A transverse opening 22 is provided in the inner end 16 of the jaw 15 and receives the pivot pin 23 of one end of the link 20 while the other end of the link is pivoted as at 24 to the free end of the handle member 11. The jaw 15 is further provided with an opening 25 to receive the pivot pin 26 of one end of the link 21 while the other end of the said link carries a pivot pin 27 that is received in an opening 28 in the jaw member 29, the said jaw 29 being slotted as at 30 for the reception of one end of the link 21. A transverse opening 31 is provided in the jaw member 29 and receives the pivot pin 32 by which the same is pivotally mounted in the handle head 14 as clearly shown in Fig. 3.

The pan engaging arm consists of an angle piece 33 positioned on the outer face of the jaw 29 and slotted as at 34 through which passes a screw 35 into the opening 36 in the said jaw and which is adapted to position the angle member 33 on the said jaw. Connected to the lower end of the member 33 is a curved arm 37, the face of which is preferably provided with an asbestos covering 38 adapted to engage the outside of the pan designated A in Fig. 3 to prevent the same from slipping thereover and to also render the holder a nonconductor of heat. The pan engaging face of the jaw 15 is also provided with an asbestos or similar covering 39 which engages the inner face of the pan A.

Fig. 1 shows the device in its normal inoperative position with the spring 31 engaging at its free end the handle arm 11 which will cause the jaws 15 and 29 to be held in open position. When the handle members 10 and 11 are moved to closed position or toward each other, the jaws 15 and 29 are closed. It is to be noted that the pivots for the jaws as at 18 and 32 and the pivots for the links as at 23, 26 and 27 all move on different arcs so that when the said handle members are moved toward each other, the link 20 connected as at 23 to the inner end of the jaw 15 will move the said jaw on the pivot 18 in a downward direction, while the connecting link 21 between the jaws 15 and 29 will cause the lower jaw 29 to move in a downward direction but at a slower rate of travel than the upper jaw so that the same will be brought together as shown in Fig. 3. To provide a sure grip for the pan A, the pan engaging arm 37 is readily adjustable over the jaw 29 by the adjusting screw 35. When pressure on the handle members 10 and 11 is released, the spring 13 will cause the said members to be separated and move on the pivot 12 with the result that the jaws 15 and 29 will be moved to open position as shown in Fig. 1.

While I have shown and described the preferred embodiment of the present invention, I do not wish to confine myself to the exact details of construction shown, as various forms, modifications and arrangements of the parts as shown may be had without departing from the spirit and scope of the invention as claimed.

What I claim as new is:—

1. In a pan lifter, a pair of handles pivoted at their rear ends, a bifurcated head carried by the forward end of one of the handles, a pair of jaws pivoted in said head, a link connecting the jaws, a second link connected to one of the jaws and to the forward end of the other of said handles and a spring for holding the jaws in normally separated condition.

2. In a pan lifter, a pair of handle arms, a pair of jaws pivoted in the outer end of one of said arms, a link connecting the jaws beyond the pivot points, a second link connecting the other of said handle arms to one of said jaws and adapted to close the jaws by moving them in the same general direction at different speeds.

In testimony whereof I affix my signature in presence of two witnesses.

JACOB WASIK.

Witnesses:
K. M. WOSZCZYNSKI,
BARTLONNEJ RUTYNO.

Copies of this patent may be obtained for five cents each, by addressing the "Commissioner of Patents, Washington, D. C."